United States Patent [19]

Nakamura

[11] 4,251,373
[45] Feb. 17, 1981

[54] SQUEEZE-FILTER PLATE FOR USE IN FILTER PRESS

[75] Inventor: Masayuki Nakamura, Osaka, Japan

[73] Assignee: Kurita Machinery Manufacturing Co., Ltd., Osaka, Japan

[21] Appl. No.: 27,017

[22] Filed: Apr. 10, 1979

[30] Foreign Application Priority Data

Dec. 21, 1978 [JP] Japan .................................. 53-159047

[51] Int. Cl.³ ...................... B01D 25/32; B01D 25/00
[52] U.S. Cl. .................................. 210/225; 210/228; 210/350
[58] Field of Search .............................. 210/224–231, 210/350, 351

[56] References Cited

U.S. PATENT DOCUMENTS 3,737,041  6/1973  Kitajima et al. ...................... 210/228
3,957,645  5/1976  Kurita et al. .......................... 210/231

FOREIGN PATENT DOCUMENTS 199478  11/1965  Sweden ................................... 210/231

Primary Examiner—Charles N. Hart
Assistant Examiner—E. Rollins Cross
Attorney, Agent, or Firm—Wenderoth, Lind & Ponack

[57] ABSTRACT

A squeeze-filter plate for use in such a filter press as to squeeze a cake of solid substances which is built up within a filtration room defined between the squeeze-filter plate and a filter plate adjacent thereto. The squeeze-filter plate is composed of a diaphragm means having a central portion and an outer peripheral portion, and a frame for supporting the diaphragm means. The outer peripheral portion has at least one structure for discharge a filtered liquid from the surface of the diaphragm to a passage in the frame. This structure is constituted by at least one aperture defined in the outer peripheral portion having a solid plug portion positioned therein and at least one socket member housed in the aperture for defining at least two discharge passages each of which guides a filtered liquid from one of the surfaces of the central portion to the passage in the frame without clogging occurring therein.

7 Claims, 16 Drawing Figures

SQUEEZE-FILTER PLATE FOR USE IN FILTER PRESS

The present invention relates to a squeeze-filter plate for use in such a filter press as to squeeze a cake solid substances contained in a slurry to be filtered which is built up between a pair of filter webs covering a filtration room defined by and between the squeeze-filter plate and a filter plate positioned adjacent to and on one side of the squeeze-filter plate and, more particularly, to an improvement in construction for discharging a filtered liquid from each of the opposed surfaces of said squeeze-filter plate to a collecting duct.

Conventionally, a squeeze-filter plate for use in the above mentioned filter press is known which is constituted by a diaphragm means made of resilient material such as a rubber, having a hollow space therein and being expandable towards opposed directions perpendicular to said plate by feeding a pressurized gas into said hollow space to squeeze said cake, and a frame made of rigid material surrounding and supporting the outer periphery of said diaphragm means.

In this type of a squeeze-filter plate, at least one guide member made of rigid material is employed to guide and discharge smoothly a filtered liquid penetrating through a filter web covering the filtration room out from the surface of said diaphragm means to a collecting duct of the filter press.

For this purpose, there is proposed conventionally such a guide member made of a metal which is fitted by the use of connecting bolt nuts, or bonded with a suitable chemical bonding agent, to a portion on the surface of said diaphragm to which said guide member is attached as is disclosed in Japanese Utility Model Publication No. 12776/1975 or Japanese Patent Publication No. 30543/1978.

However, said guide member of this type has some disadvantages owing to the fact that passages of said guide member for the discharge of a filtered liquid is provided substantially in the direction of the thickness of said guide member, i.e., in the direction of application of the pressure between said squeeze-filter plate and an filter plate adjacent thereto, not in a direction along each of the opposed surfaces of said diaphragm and that a possible deformation that said portion of said diaphragm to which said guide member is attached undergoes during press operation is not sufficiently taken into consideration.

Owing to above mentioned facts, said passages of said guide member are often clogged by solid material contained in a filtered liquid, the cross section of said passage is reduced due to deformation of said portion of said diaphragm and/or the corresponding portion of the adjacent filter plate.

Therefore, the flow of the filtered liquid is limitted, said guide member is slipped out from the correct position, and/or edges of said guide member stick into said diaphragm due to the higher rigidity thereof so that the diaphragm is damaged.

These defects bring about a liquid leakage from said portion of said diaphragm to which said guide member is attached.

Therefor, it is an object of the present invention to provide a squeeze-filter plate wherein no liquid leakage occurs from the portion of the diaphragm to which the guide member for the discharge of the filtered liquid is attached.

It is another object of the present invention to provide a squeeze-filter plate wherein the guide member for the discharge of the filtered liquid is fixed or held in position by insertion.

It is a further object of the present invention to provide a squeeze-filter plate having at least two passages for the discharge of the filtered liquid which extend along or in parallel to each of the opposed surfaces of said diaphragm so that the filtered liquid can smoothly be guided therethrough from said surfaces to a collecting duct of the filter press without any clogging occurring therein.

A squeeze-filter plate according to the present invention is comprised of a diaphragm means made of resilient material and having a central portion, in which a hollow space adapted to receive a pressurized gas is defined, and an outer peripheral portion of a larger thickness than the thickness of said central portion, a frame made of rigid material surrounding and surpporting said outer peripheral portion of said diaphragm means, said frame having at least one passage, one end of which is connected to a collecting duct while the other end thereof is opened at one surface of said frame facing said peripheral portion of said diaphragm means, and at least one structure for discharging a filtered liquid from the surface of said diaphragm to said passage in said frame, said structure being constituted by at least one aperture defined in said outer peripheral portion having a solid plug portion positioned therein and at least one socket member housed in said aperture for defining at least two discharge passages each extending along said plug portion from a space defined between one of the filter webs and one of the opposed surface of said central portion to one end of said passage in said frame.

These and other objects and features of the present invention will become apparent to those skilled in the art from the following description taken in conjunction with preferred embodiments thereof with reference to accompanying drawings, in which.

Before the description of the present invention proceed, it is to be noted that like parts are designated by like reference numerals throughout the accompanying drawings.

Figure 1:
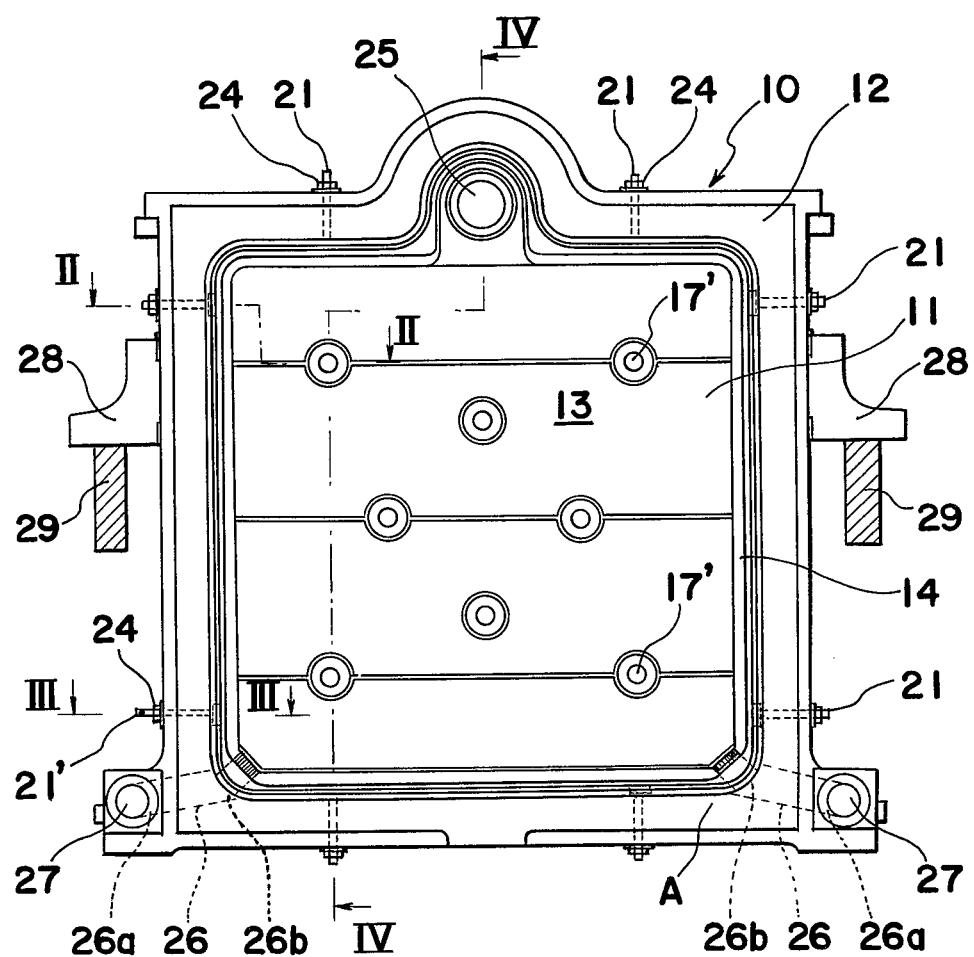
FIG. 1 is a front view of a squeeze-filter plate according to one preferred embodiment of the present invention.
Figure 2:
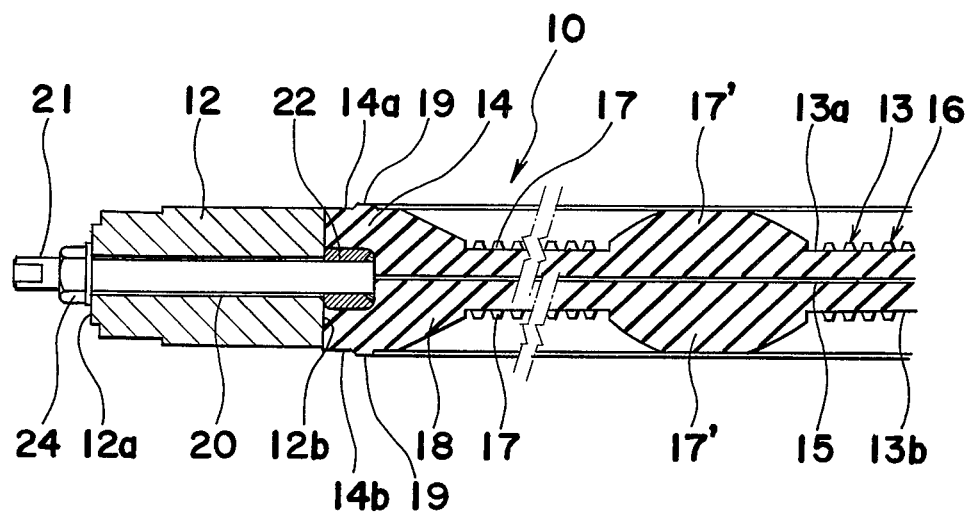
FIG. 2 is a partial cross-sectional view taken along a line II—II in FIG. 1.
Figure 3:
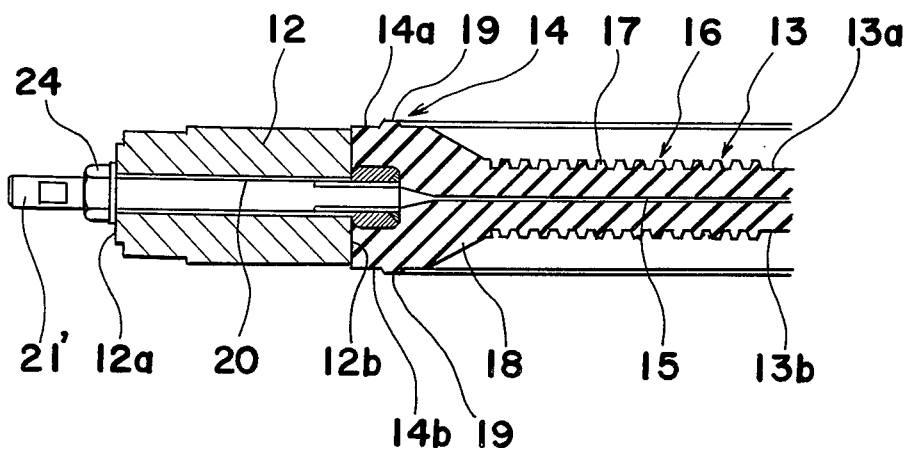
FIG. 3 is a partial cross-sectional view taken along a line III—III in FIG. 1.

As shown in FIGS. 1 to 3, a squeeze-filter plate 10 according to the present invention is composed of a diaphragm means 11 made of resilient material such as a rubber, and a frame 12 made of rigid material such as a metal for supporting the outer periphery of said diaphragm means 12 fixedly.

The diaphragm means 11 is substantially square in shape and has a central portion 13 occupying a major area of the diaphragm means 1 and an outer peripheral portion 14 of a relatively larger thickness than the thickness of a central portion 13. The central portion 13 has a hollow space 15 defined therein which is positioned intermediately of the thickness of the central portion 13. The central portion 13 further has a pair of flow guide means 16 formed on any one of the opposed surfaces 13a and 13b, said flow guide means 16 being constituted by many parallel ribs 17. It is desirable to provide a pair of convex portions 17' each being conical with head being cut off at the proper locations of the opposed surfaces 13a and 13b in order to maintain the minimum thickness of the diaphragm means.

The outer peripheral portion 14 of the diaphragm means 11 is formed with a tapered portion 18 with the thickness gradually increasing from the central portion to the outer peripheral portion.

Figure 7:
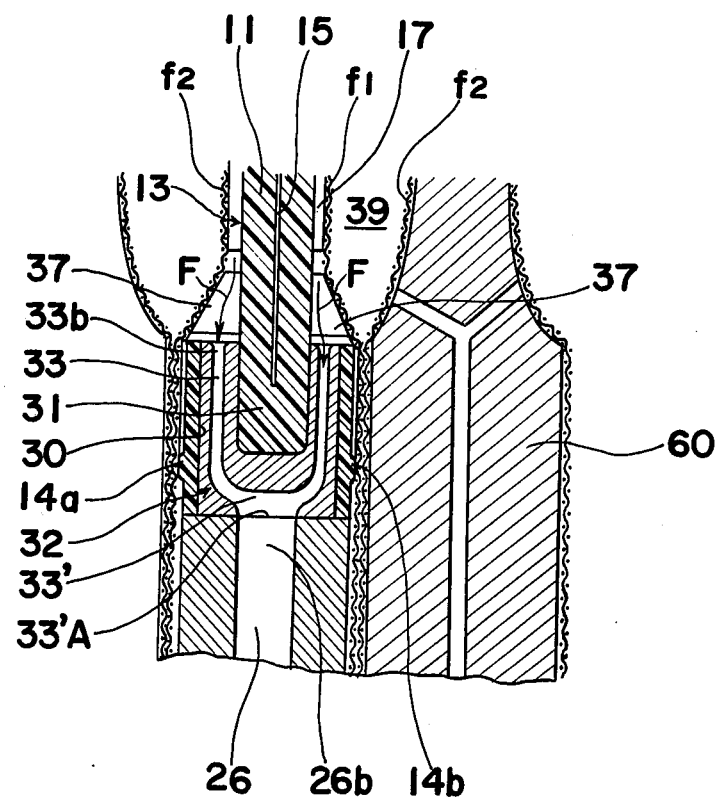
FIG. 7 is a partial cross-sectional view showing a structure for the discharge or guide of the filtered liquid according to the embodiment of the present invention.
Figure 8:
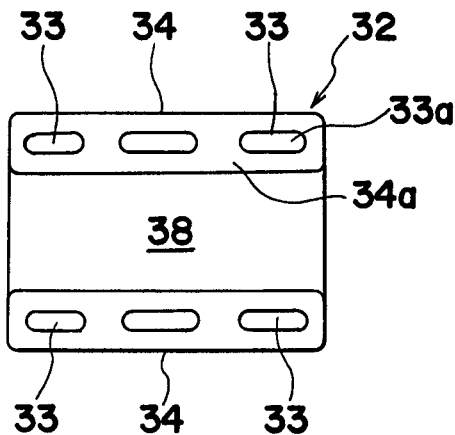
FIG. 8, 9, 10 are a plan view, a front view and bottom view, respectively, of the socket member according to the embodiment of the present invention.
Figure 9:
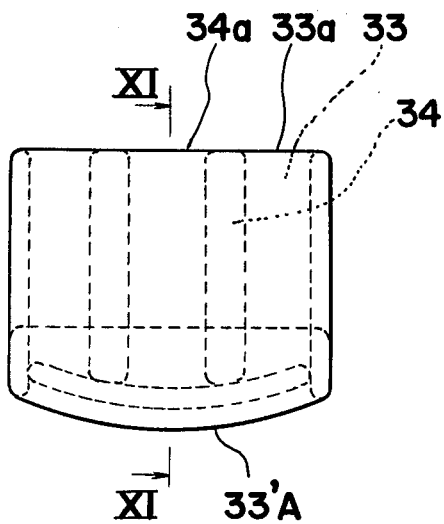
Figure 10:
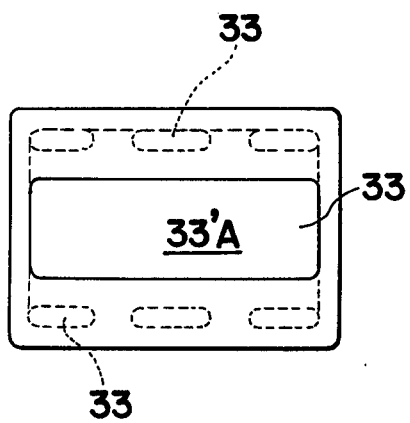

On each of the opposed surface 14a and 14b of said outer peripheral portion 14, there is provided a rib 19 for liquid-tight contact with an adjacent filter plate shown by 60 in FIG. 7.

The frame 12 for supporting said diaphragm means 11 is substantially rectangular in shape and similar in shape to the diaphragm means 11. As shown in FIG. 2, the frame 12 has several holes 20 for bolts 21 each so drilled therethrough from the outer surface 12a of the frame 12 to the inner surface 12b of the frame 12. The diaphragm means 11 is supported in position by the frame 12 with the bolts 21 extending through the respective bolts 20 in the frame 12 and receiving nuts 24 fastened thereto. It is to be noted that one end of each bolt 21 remote from the corresponding nut 24 is anchored to a corresponding nut 22 embedded in the outer peripheral portion 14 of the diaphragm means 11.

As shown in FIG. 3, one or two of those bolts 21, for providing the passage of a pressurized gas therethrough. For this purpose, outer ends of said tubular bolts 21' are connected to a pressurized gas source (not shown) and inner ends of said bolts 21' are communicated to said hollow space 15 in diaphragm means 11 so that the pressurized gas can be fed into the hollow space 15 to expand the central portion 13 of said diaphragm means 11 in the opposed directions perpendicular to the center plane thereof.

Figure 4:
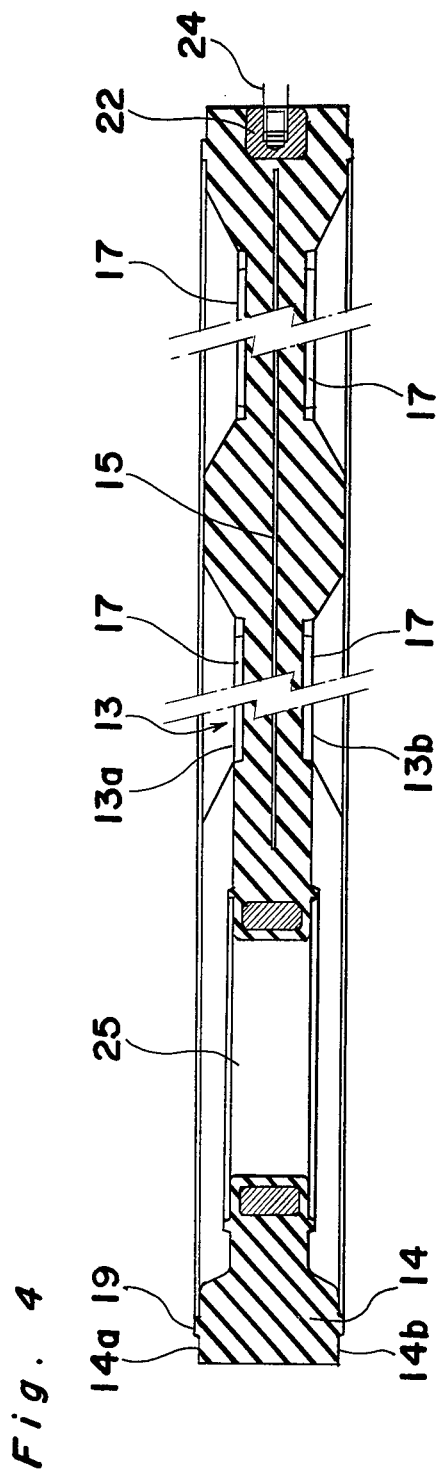
FIG. 4 is a cross-sectional view taken along a line IV—IV in FIG. 1.

On the other hand, as shown in FIG. 1 and FIG. 4, the outer peripheral portion 14 of the diaphragm means 11 has a slurry feeding hole 25 at the upper middle portion thereof as is well known to those skilled in the art. As shown in FIG. 1 by the broken lines, the frame 12 has at least one passage 26 therein one end 26a of which is connected to a collecting duct 27 while the other end 26b thereof is opened at the inner surface 12b of said frame facing said outer peripheral portion 14 of said diaphragm means. Also, the frame 12 has a pair of wing member 28 fixed to right and left hand sides thereof respectively, through which wing members 28 the filter plate 10 is suspended slidably on a pair of guide rails 29, provided between front and rear stands (not shown) of the filter press.

Figure 5:
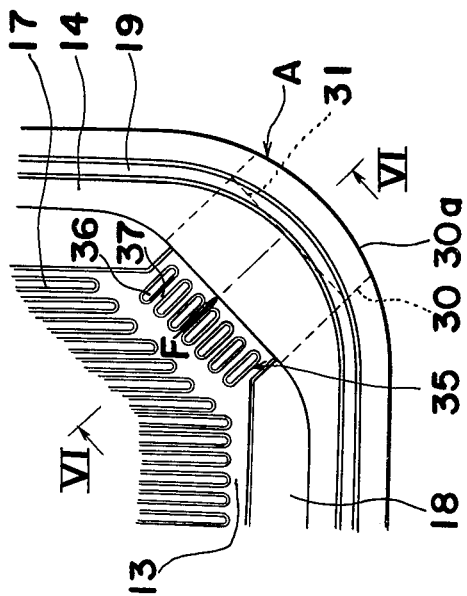
FIG. 5 is a partial front view, on an enlarged scale, showing a portion A shown in FIG. 1.
Figure 6:
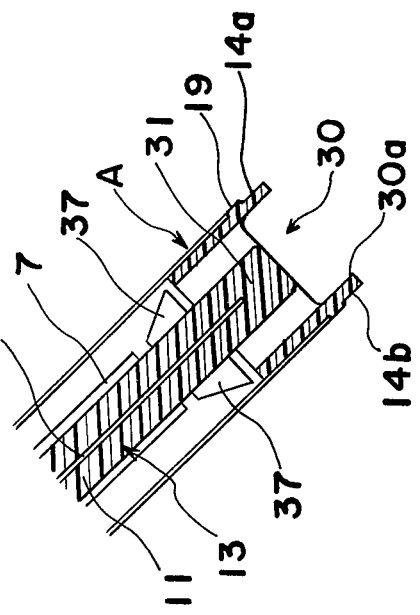
FIG. 6 is a cross-sectional view taken along a line VI—VI in FIG. 5 with a socket member removed.

As shown in FIGS. 5 and 6, there is provided an aperture 30 at the portion A, desirablly the corner, of the outer peripheral portion 14 corresponding to said passage 26 of the frame 12. Said aperture 30 is in the form of a cutout formed by cutting said portion so as to leave the opposed outer surfaces 14a, 14b in the direction of the thickness of the said portion A. A plug portion 31 protrudes in said aperture 30 from the central portion 13 towards and spaced from the port 30a of the aperture 30 facing to the other end 26b of said passage 26 in the frame 12.

Figure 11:
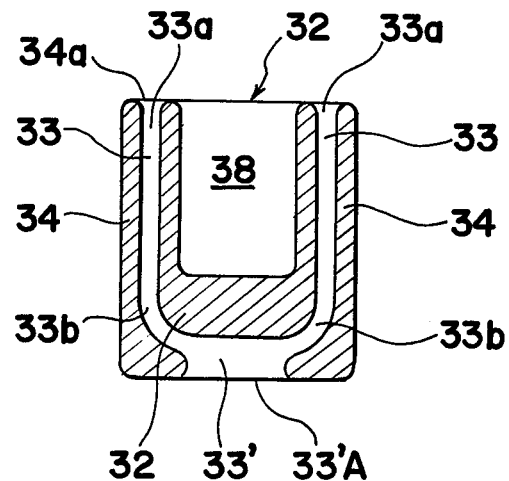
FIG. 11 is a cross-sectional view taken along a line XI—XI in FIG. 9.
Figure 12:
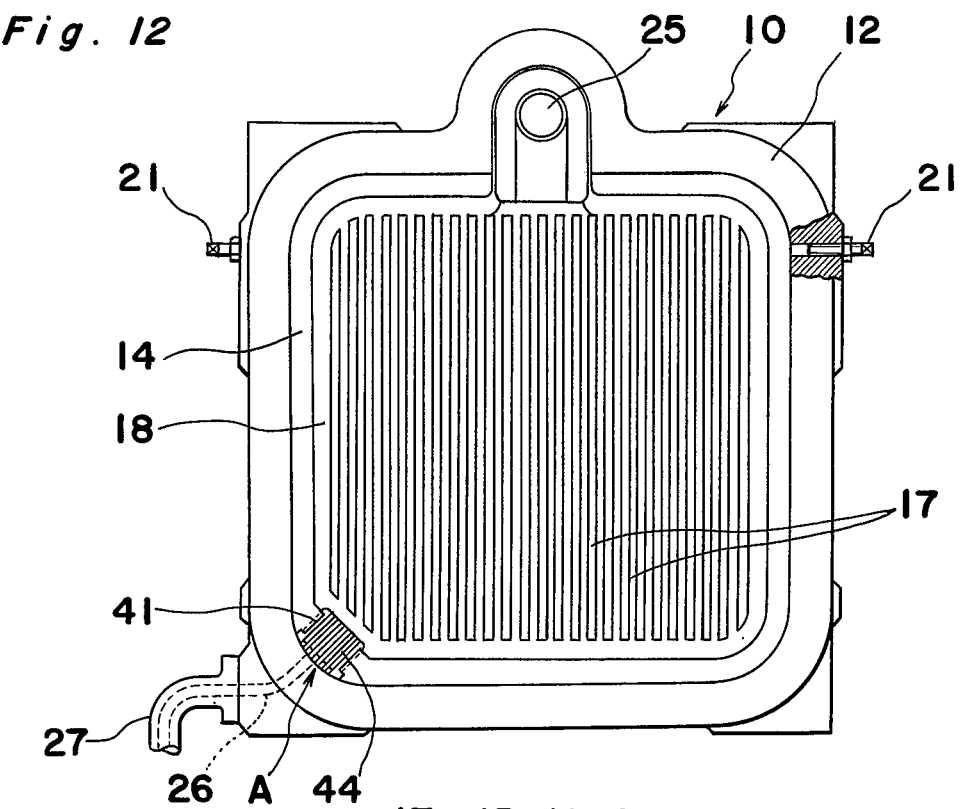
FIG. 12 is a front view of the squeeze-filter plate according to another embodiment of the present invention.

Also, there is provided a socket member 32, as shown FIG. 8 to 11, made of rigid material such as an iron and having discharge passages 33 defined therein. The socket member 32 is U-shape in cross-section as shown in FIG. 11 and each of pair of said walls 34 of the socket member 32 has passages 33 defined therein, each one end 33a of which is opened to the free end surface 34a thereof while the other end 33b is connected commonly to a collecting passage 33' which is formed in the bottom portion 32B of the socket member 32. As shown in FIG. 7, the socket member 32 is so designed as to fit into said aperture 30 with the plug portion 31 in said aperture 30 received into the space 38 between the pair of side walls of the socket member 32. The outlet 33'A of the collecting passage 33' of the socket member 32 is fitted also to the other end 26b of the passage 26 in said frame 12. It is desirable to round suitably all of edges of said socket member 32 for preventing them from piercing into said peripheral portion 14.

Referring again to FIG. 5, 6 and 7, the part of said tapered portion 18 of said diaphragm means 11 corresponding to said aperture 30 is cutted off to form the same surface 13a or 13b of the central portion 13 and a flow guide means 35 is provided on each of the opposed surfaces of said cut off part.

The flow guide means 35 is constituted by many ribs 36 spaced from each other to defined many slots 37 therebetween so that a filtered water, which has penetrated through the interstices of the filter webs f1, f2 covering the filtration room 39 formed between the squeeze-filter plate 10 and adjacent filter plate 60, can be guided smoothly from the central portion 13 to passages 33 of the socket member 32, during the press cycle or the squeeze-press cycle of the filter press, in a direction shown by the arrow F in FIGS. 5 and 7. The filtered liquid being guided by said flow guide means 35 flows into the other ends 33a of discharge passage 33 provided in the socket member 32 smoothly without altering the direction of flow thereof and is discharged through the collecting passage 33' of the socket member 32 and then the passage 26 in the frame 12 to the collecting duct 27.

FIGS. 12, 13, 14, 15 and 16 show another embodiment of the present invention. In this embodiment, there is provided at least one aperture 40 at the part A of the outer peripheral portion 14 corresponding to the passage 26 in the frame 12 which is constituted by a pair of dovetail grooves 41 extending respectively from the opposed surfaces 14a and 14b of said outer peripheral portion in a direction towards each other and terminating spaced from each other with a plug portion 42 left between said dovetail grooves 41, said plug portion 42 having a thickness substantially equal to the thickness of the central portion 13 of the said diaphragm means 11.

A socket member 43 is constituted by a pair of rigid blocks 44, each of which is so designed as to fit into the corresponding dovetail groove 41. Said rigid block 44 has an erected wall 45 and a flange 46 formed perpendicularly to the base of the erected wall 45.

Figure 15:
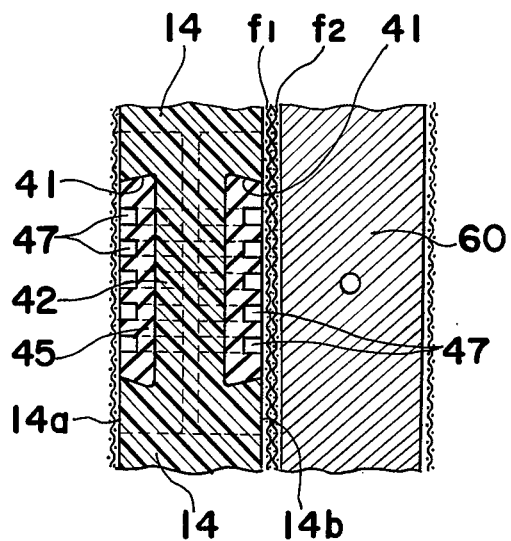
Figure 16:
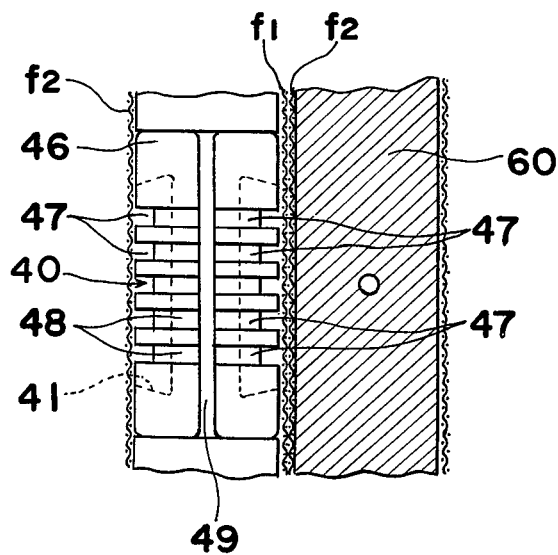

Said erected wall 45 is a dovetail wall so designed as to fit into said dovetail groove 41 as shown clearly in FIG. 15 and has several parallel slots 47 each extending from the upper end surface 45a to the base end surface at the outer surface thereof. The outer edge of the upper end of said erected wall is cutted off to form the same surface as of the tapered portion 18 of said diaphragm means 11.

The flange 46 is formed around the base of the erected wall 45 except the outer surface of the erected wall having said slots 47 and has slots 48 formed at the bottom surface thereof, each one end of which is connected to each one end of slots of the erected wall while the other end extends transversely in a direction widthwise thereof to reach a collecting slot 49 which is formed between the opposed inner surfaces of the pair of said flanges 46 of said blocks 44.

Figure 13:
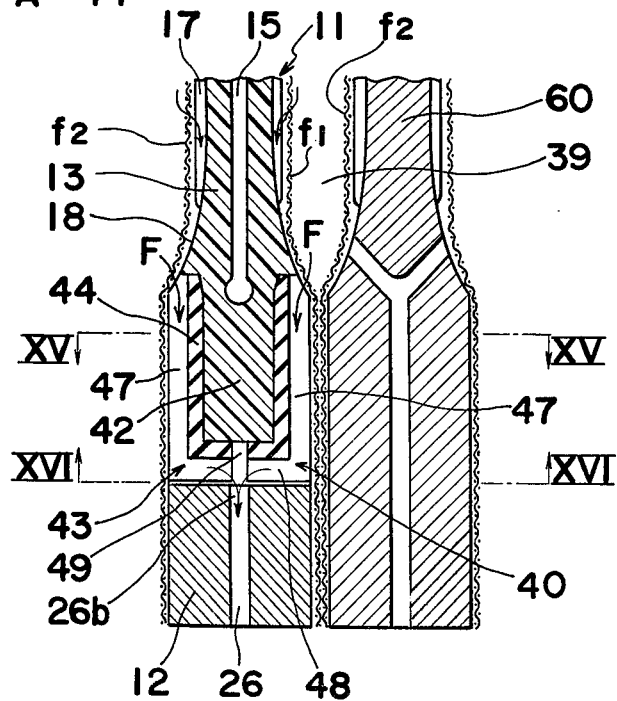
FIG. 13 is a partial cross-sectional view, corresponding to FIG. 7, showing a structure for the discharge or guide of the filtered liquid according to said another embodiment of the present invention.
Figure 14:
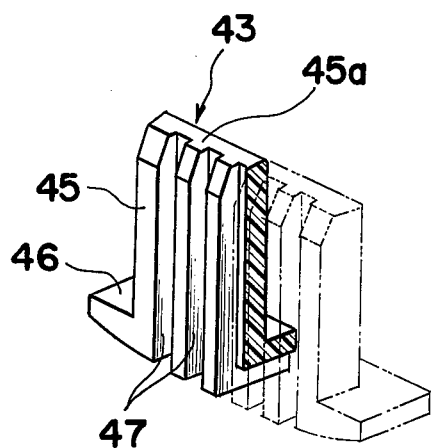
FIG. 14 is a partial perspective view showing one of a pair of blocks constituting a socket member according to said another embodiment of the present invention; and, FIGS. 15 and 16 are cross-sectional views taken along lines XV—XV and XVI—XVI in FIG. 13 respectively.

These slots constitute at least two discharge passages for discharging and guiding a filtered liquid from the outer surfaces 13a, 13b of the central portion 13 to the passage in the frame 12 as shown apparently by arrows F in FIG. 13. These passages is able to introduce the filtered liquid smoothly from the direction along each of the surfaces 13a, 13b of the central portion 13 of said diaphragm means 11 and to guide it to the passage in the frame 12 without clogging occurring therein.

Although the present invention has fully been described in connection with the preferred embodiments thereof with reference to the accompanying drawings, it is to be noted that various changes and modifications are apparent to those skilled in the art. By way of example, the socket member in the first embodiment of the present invention may be devided into two blocks in a manner similar to the socket member in the second embodiment of the present invention.

Therefore, such changes and modifications are to be understood as included within the true scope of the present invention unless they depart therefrom.

What is claimed is:

1. A squeeze-filter plate for use in such a filter press as to squeeze a cake of solid substances contained in a slurry to be filtered which is built up between a pair of filter webs covering a filtration room defined by and between the squeeze-filter plate and a filter plate positioned adjacent to and on one side remote from the squeeze-filter plate, said squeeze-filter plate comprising;

a diaphragm means made of resilient material and having a central portion and an outer peripheral portion of a larger thickness than the thickness of said central portion, said diaphragm means further having a hollow space defined in said central portion, said hollow space being adapted to receive a pressurized fluid from a source of the pressurized fluid and flow guide means formed on each of a pair of the opposed surfaces of said diaphragm at a portion corresponding to said central portion;

said outer peripheral portion of the diaphragm means having at a least one aperture defined therein and a solid plug portion positioned in said aperture;

a frame made of rigid material surrounding and supporting said outer peripheral portion of said diaphragm means, said frame having at least one passage one end of which is connected to a collecting duct while the other end thereof is opened at one surface of said frame facing said peripheral portion of said diaphragm means; and at least one socket member housed in said aperture in said outer peripheral portion of the diaphragm means for defining at least two discharge passage each extending therethrough from a space defined between one of the filter webs and one of the opposed surfaces of the central portion of said diaphragm means which faces said one of the filter webs to one end of said passage in said frame for the discharge of the filtered medium from said flow guide means towards said collecting duct.

2. A squeeze-filter plate as claimed in claim 1, wherein said aperture is constituted by a pair of cutouts extending respectively from the opposed surfaces of said outer peripheral portion of said diaphragm means in a direction towards each other and terminating spaced from each other with a socket member left between said cutouts, said socket member having a thickness smaller than the thickness of said outer peripheral portion of said diaphragm means and substantially equal to the thickness of the central portion of said diaphragm means.

3. A squeeze-filter plate as claimed in claim 2, wherein said socket member is constituted by a pair of blocks each of which is so designated as to fit into each of said pair of cutouts.

4. A squeeze-filter plate as claimed in claim 3, wherein each of said pair of blocks has at least one discharge passage.

5. A squeeze-filter plate as claimed in claim 1, wherein said aperture is defined by a pair of opposed relatively thin walls each of which is so continued as to define the same surface as of said outer surface of said outer peripheral portion and said socket portion protrudes in said aperture from said central portion towards the outer peripheral surface of said outer peripheral portion and terminates spaced therefrom.

6. A squeeze-filter plate as claimed in any one of claims 1 and 5, wherein said socket member is constituted from one block.

7. A squeeze-filter plate as claimed in claim 6, wherein said socket member has a hole into which said plug portion is inserted.

* * * * *